(12) United States Patent
Yoon

(10) Patent No.: US 9,701,513 B2
(45) Date of Patent: Jul. 11, 2017

(54) ELEVATOR DOOR MONITOR

(71) Applicant: Il Shik Yoon, Goyang-si (KR)

(72) Inventor: Il Shik Yoon, Goyang-si (KR)

( * ) Notice: Subject to any disclaimer, the term of this patent is extended or adjusted under 35 U.S.C. 154(b) by 414 days.

(21) Appl. No.: 14/337,987

(22) Filed: Jul. 22, 2014

(65) Prior Publication Data

US 2015/0027816 A1 Jan. 29, 2015

(30) Foreign Application Priority Data

Jul. 29, 2013 (KR) .............................. 2013-0089447

(51) Int. Cl.
| | | |
|---|---|---|
| *B66B 1/34* | (2006.01) | |
| *B66B 3/00* | (2006.01) | |
| *B66B 13/30* | (2006.01) | |

(52) U.S. Cl.
CPC ................ *B66B 3/00* (2013.01); *B66B 3/008* (2013.01); *B66B 13/303* (2013.01)

(58) Field of Classification Search
CPC .......... B66B 3/00; B66B 3/008; B66B 13/303
USPC .... 187/247, 391, 395, 396, 313, 316; 49/70, 49/501, 504
See application file for complete search history.

(56) References Cited

U.S. PATENT DOCUMENTS

| | | | | |
|---|---|---|---|---|
| 4,577,177 A * | 3/1986 | Marubashi | ................ | B66B 3/00 187/396 |
| 6,336,523 B1 * | 1/2002 | Ozeki | ..................... | B66B 13/30 187/277 |
| 6,484,850 B1 * | 11/2002 | Kobayashi | ............ | B66B 13/303 187/414 |
| 6,896,105 B1 * | 5/2005 | Yamakawa | ........... | B66B 11/002 187/254 |
| 8,746,412 B2 * | 6/2014 | Rebillard | .............. | B66B 13/306 187/314 |
| 9,052,536 B2 * | 6/2015 | Artwohl | ................ | A47F 3/0434 |
| 9,162,850 B2 * | 10/2015 | Hopp | .................... | B66B 11/001 |
| 2013/0271696 A1 * | 10/2013 | Dunn | ...................... | G09F 23/06 349/58 |
| 2015/0284989 A1 * | 10/2015 | Kim | ......................... | E06B 7/28 49/70 |

(Continued)

*Primary Examiner* — Anthony Salata
(74) *Attorney, Agent, or Firm* — Richard John Baetz

(57) ABSTRACT

The present invention relates to a system for installing a monitor, which provides various types of information, on a hall door of an elevator, and provides a monitor system for an elevator door, including: a decorative glass plate 10 which is attached to a door surface of an elevator so as to cover the entire door surface; a monitor box MB which is fixed to a rear surface of the elevator door D, has a rectangular parallelepiped shape, and protrudes to a rear side of the elevator door so as to accommodate a monitor M; the monitor M which is fixed in the monitor box MB; a reinforcing glass plate 20 which is disposed between the glass plate 10 and the monitor M, and has a size that covers the entire monitor so as to protect the monitor M from frontal impact; a reinforcing glass plate fixing member 30 which supports and fixes the reinforcing glass plate 20 so that the reinforcing glass plate 20 has the same height as the surface of the elevator door D; a ventilation member 40 which discharges heat generated from the monitor M to the outside of the elevator door D; and a control box C which is connected to the monitor M, and controls various types of signals and electricity supply for the monitor.

6 Claims, 6 Drawing Sheets

(56) References Cited

U.S. PATENT DOCUMENTS

2016/0185569 A1* 6/2016 Sonnenmoser ....... B66B 5/0025
187/393

* cited by examiner

ELEVATOR DOOR MONITOR

CROSS REFERENCE TO RELATED APPLICATION

This application claims the priority benefit of Korean Patent Application No. 2013-0089447 filed Jul. 29, 2013.

TECHNICAL FIELD

The present invention relates to a monitor system for an elevator door, and more particularly, to a system for installing a monitor, which provides various types of information on a hall door of an elevator.

BACKGROUND ART

FIG. 1 is an overall schematic view for operating a car monitor CM installed in a cage or car of the existing elevator. The car monitor CM in the related art is installed in the elevator cage, and thus the car monitor CM is naturally moved upward and downward always with the elevator. In order to permit the upward and downward movement, wires, which are connected to the car monitor CM so as to supply electricity and various types of signals, are integrally connected to a traveling cable TC for supplying electric power to the elevator, and in general, the traveling cable TC is connected to a server computer in a control room which is far away from the elevator.

Since power supply lines and network lines of the car monitor CM are coupled together with the traveling cable for the elevator cage, as described above, the traveling cable is bound with various other wires. Therefore, signal interference between signals of various other wires may easily occur when signals are supplied to the car monitor CM, and for this reason, there are many cases in which the car monitor CM cannot exhibit its own function. Further, since the various other wires are bound with the traveling cable TC, it is difficult to perform installation and maintenance, and it also takes high cost to perform installation and maintenance.

In addition, the passenger can see the car monitor CM only when the passenger travels in the elevator, and moreover, there are many cases in which the passenger merely sees a target floor number, and as a result, an effect of transmitting an advertisement or information through the car monitor CM greatly deteriorates even more.

DISCLOSURE

Technical Problem

The present invention has been made in consideration of the aforementioned problems in the related art and an object of the present invention is to reduce costs for installation and maintenance by installing a monitor on an elevator door that is not moved upward and downward, and by fixing a separate connecting line along a hoistway of an elevator without using a traveling cable TC in the related art.

In addition, an object of the present invention is to not only allow an elevator passenger to easily obtain various types of advertisements and information through a monitor when the elevator passenger waits for an elevator by installing the monitor on an elevator door, but also allow other general people, who pass through a hall, to obtain advertisement or information in addition to the elevator passenger.

Technical Solution

In order to achieve the objects of the present invention, the present invention provides a monitor system for an elevator door, including: a decorative glass plate 10 which is attached to a door surface of an elevator so as to cover the entire door surface: a monitor box MB which is fixed to a rear surface of the elevator door D. has a rectangular parallelepiped shape, and protrudes to a rear side of the elevator door so as to accommodate a monitor M; the monitor M which is fixed in the monitor box MB; a reinforcing glass plate 20 which is disposed between the glass plate 10 and the monitor M, and has a size that covers the entire monitor so as to protect the monitor M from frontal impact; a reinforcing glass plate fixing means 30 which supports and fixes the reinforcing glass plate 20 so that the reinforcing glass plate 20 has the same height as the surface of the elevator door a ventilation means 40 which discharges heat generated from the monitor M to the outside of the elevator door D; and a control box C which is connected to the monitor M, and controls various types of signals and electricity supply for the monitor.

In the monitor system of the present invention, the control box C may include a local computer C1, an electric transformer T, and a second ventilation means C2.

In addition, the reinforcing glass plate fixing means 30 may include a reinforcing glass plate support 32 which is installed along an edge of the monitor box MB, and has an L-shaped cross section, a fastener 34 which penetrates the reinforcing glass plate support 32 so as to fasten the reinforcing glass plate support 32 to the monitor box MB, and a shock absorbing member 36 which is disposed between the reinforcing glass plate support 32 and the edge of the reinforcing glass plate 20, and made of an elastic material, and a front surface of the door D, as front surface of the reinforcing glass plate support 32, and a front surface of the reinforcing glass plate 20 may be matched in a state in which installation is completed.

In addition, the ventilation means 40 may include an air inlet 42 formed at a lower end of the monitor box MB, and an air outlet 44 formed at an upper end of the monitor box MB.

The control box C may be positioned below a floor selection button B, or installed on an inner wail surface of an elevator hoist hole.

Advantageous Effects

According to the monitor system of the present invention, which is configured as described above, a separate connecting line is fixed along a hoistway of the elevator without using a traveling cable TC in the related art, such that costs for installation and maintenance are low, and signal interference is reduced in comparison with the related art, thereby providing clearer image quality.

In addition, the elevator passenger may easily obtain various advertisements or information through the monitor when the elevator passenger waits for the elevator, and other general people, who pass through the hall, can see the monitor in addition to the elevator passenger.

In addition, in order to maintain a local computer in a case in which the traveling cable in the related art is connected, the elevator needs to be stopped, and the maintenance needs to be performed above the cage, but according to the present invention, the maintenance may be easily performed in a hallway.

BEST MODE

Figure 1:
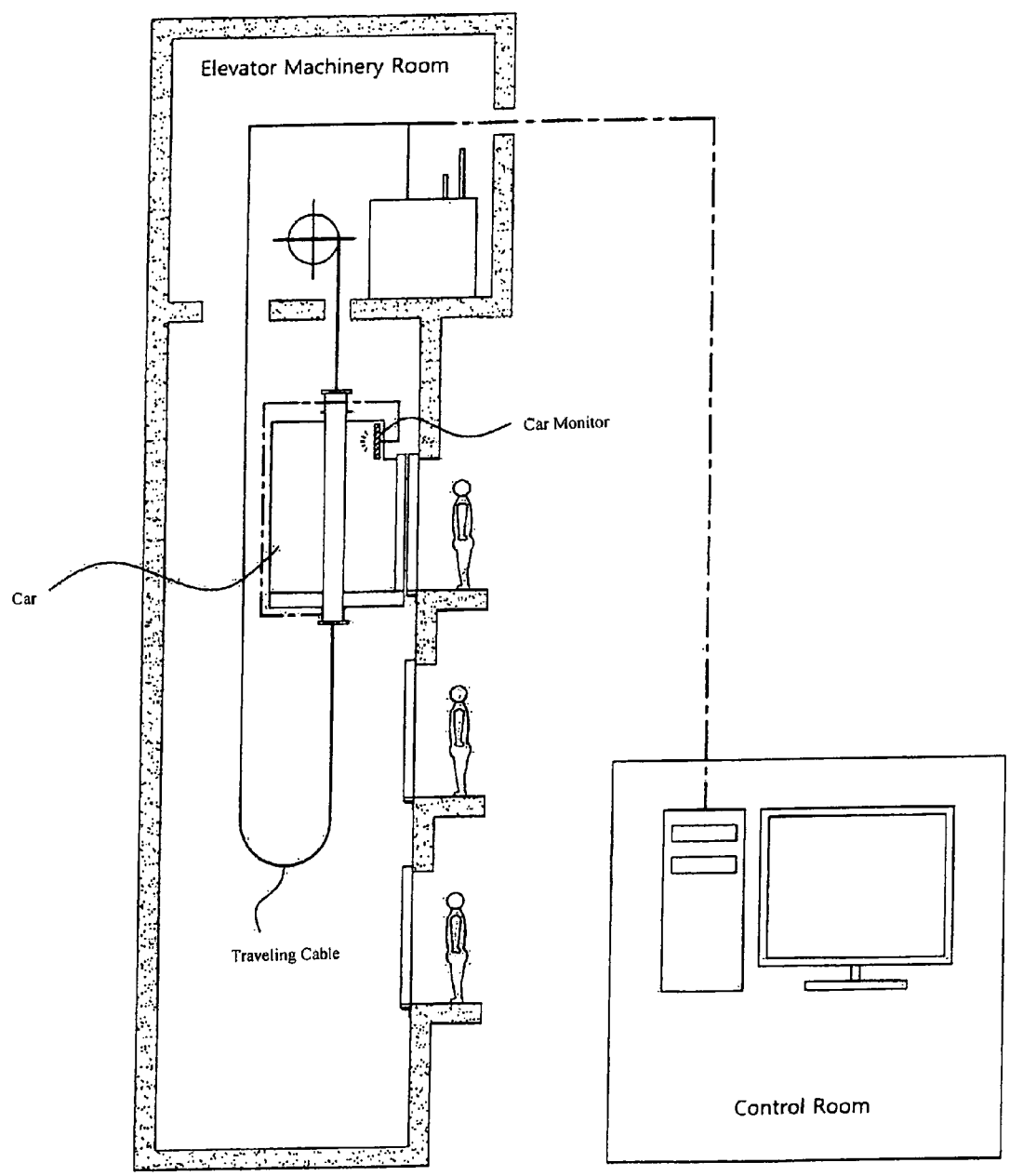
FIG. 1 is an overall schematic view for operating a car monitor CM installed in a cage or car of the existing elevator.
Figure 2:
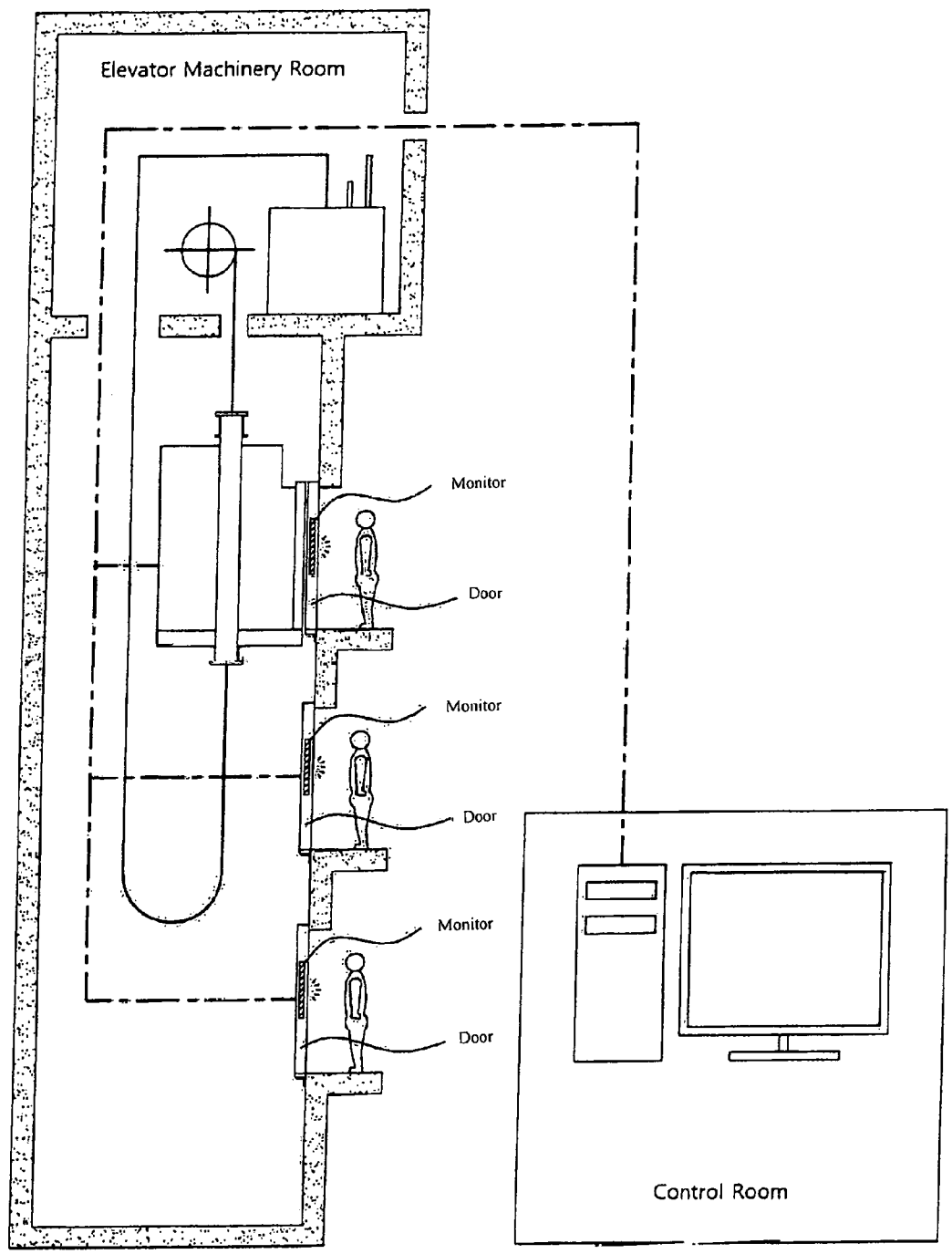
FIG. 2 is a schematic view illustrating an elevator hoistway and an elevator door D implemented by the present invention, and a passenger standing in front of the door.

FIG. 2 is a schematic view illustrating an elevator hoistway and an elevator door D implemented by the present invention, and a passenger standing in from of the door. As illustrated, according to the present invention, the passenger may obtain information through a monitor M installed on the elevator door D regardless of the cage of the elevator.

Figure 3:
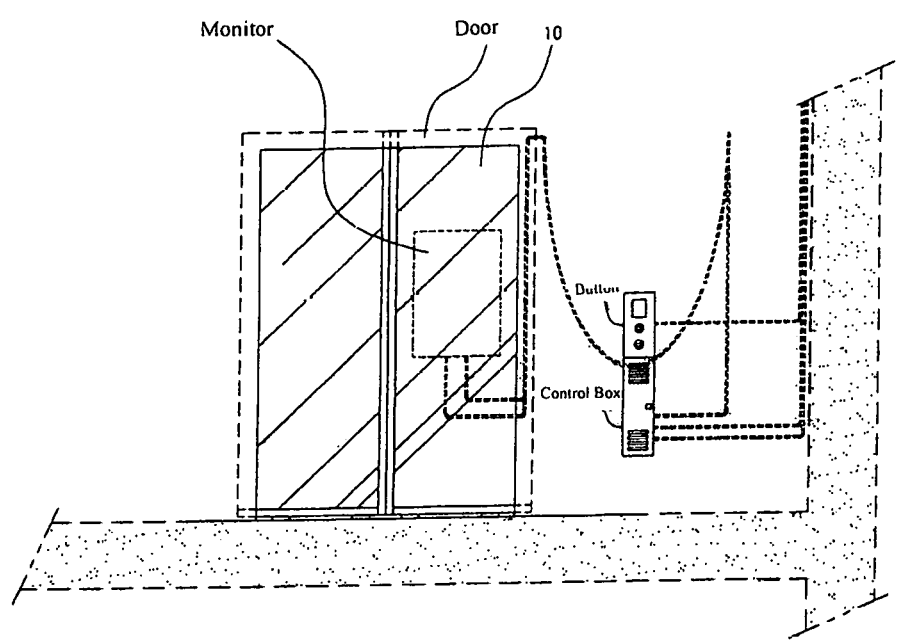
FIG. 3 is a schematic front view illustrating examples of the elevator door D on which a monitor M according to the present invention is installed, and a control box C which controls the monitor, and is installed below a floor selection button B.

FIG. 3 is a schematic front view illustrating examples of the elevator door D on which the monitor M according to the present invention is installed, and a control box C which controls the monitor, and is installed below a floor selection button B in an elevator hallway.

As illustrated, the monitor M and the control box C are connected by wires (indicated by dashed lines) that are disposed in the door and a hoistway disposed inside a wall of the hallway. The control box C is connected with a non-illustrated control room. As illustrated in FIG. 3, the wires, which connect the control box C and the monitor M, are connected while having an available space that permits an operation of opening and closing the elevator door D leftward and rightward. The control box C includes a local computer C1, an electric transformer T, and a ventilation means C2.

Figure 4:
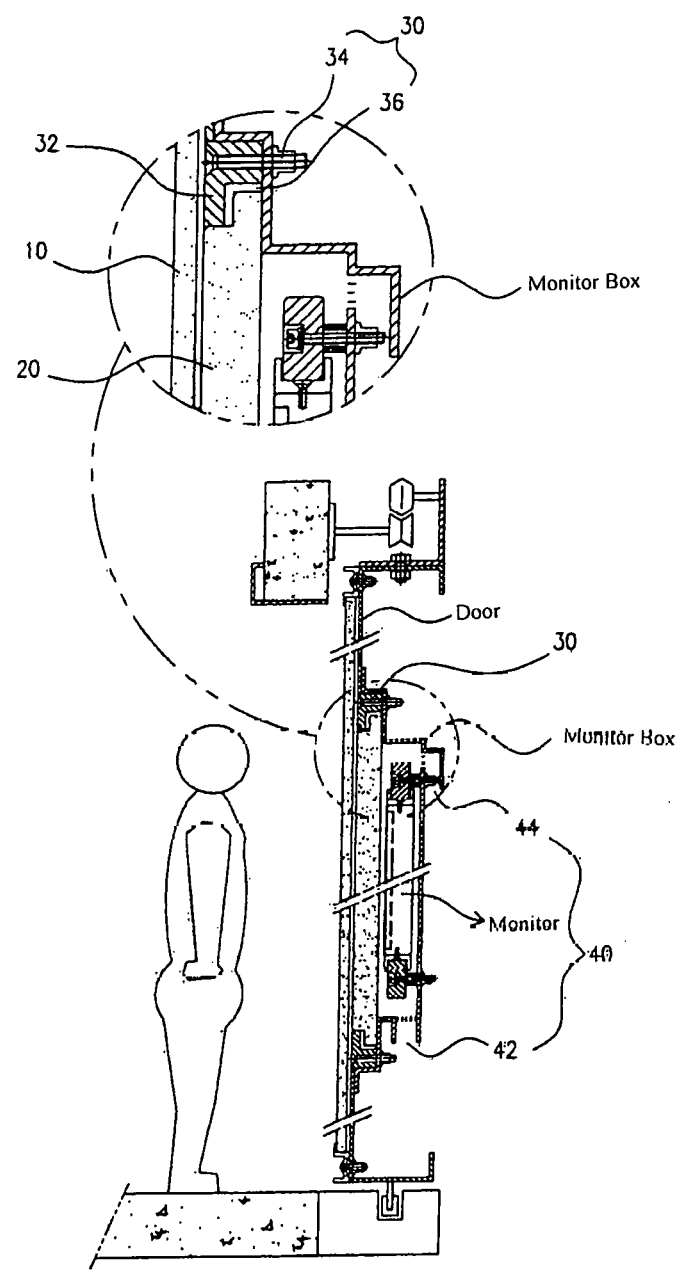
FIG. 4 is a side cross-sectional view and a partially detailed view of the elevator door on which the monitor according to the present invention is installed.

FIG. 4 is a side cross-sectional view and a partially detailed view of the elevator door on which the monitor according to the present invention is installed.

As illustrated, a decorative glass plate 10 is attached to a door surface so as to cover the entire surface of the elevator door D. The decorative glass plate 10 serves to improve an aesthetic appearance of the door, and prevent the door surface from being damaged. A box-shaped monitor box MB, in which the monitor M, which will be described below, is installed, is fixed to a rear surface of the elevator door D. The monitor box MB has a rectangular parallelepiped shape that protrudes to a rear side of the elevator door. The monitor M is fixed in the monitor box M.

In addition, a reinforcing glass plate 20, which has a size that covers the entire monitor, is disposed between the decorative glass plate 10 and the monitor M in order to protect the monitor M from frontal impact. For example, the monitor M may be damaged when a large amount of impact is applied from a from side of the glass plate 10, and thus the reinforcing glass plate 20 is disposed between the glass plate 10 and the monitor M in order to prevent the damage. It is good enough if the reinforcing glass plate 20 has a size that may cover the entire front surface of the monitor M.

A reinforcing glass plate fixing means 30 is used to support. and fix the reinforcing glass plate 20 so that the reinforcing glass plate 20 has the same height as the surface of the elevator door D. The fixing means 30 will be described below in detail with reference to FIGS. 4 and 5.

Meanwhile, in general, a large amount of heat is generated when the monitor M is operated, and the heat needs to be necessarily discharged to the outside. To this end, a ventilation means 40 for discharging the heat, which is generated from the monitor M, to the outside of the elevator door D may be formed in the monitor box. The ventilation means 40 may include an air inlet 42 formed at a lower end of the monitor box MB, and an air outlet 44 formed at an upper end of the monitor box MB, such that the high-temperature air is discharged through the air outlet 44 at the upper side by natural convection, and the fresh low-temperature air flows into the air inlet 42 at the lower side. However, it should be appreciated that a configuration, in which a forced ventilation device such as a ventilator is installed, if necessary, belongs to the scope of the present invention.

Figure 5:
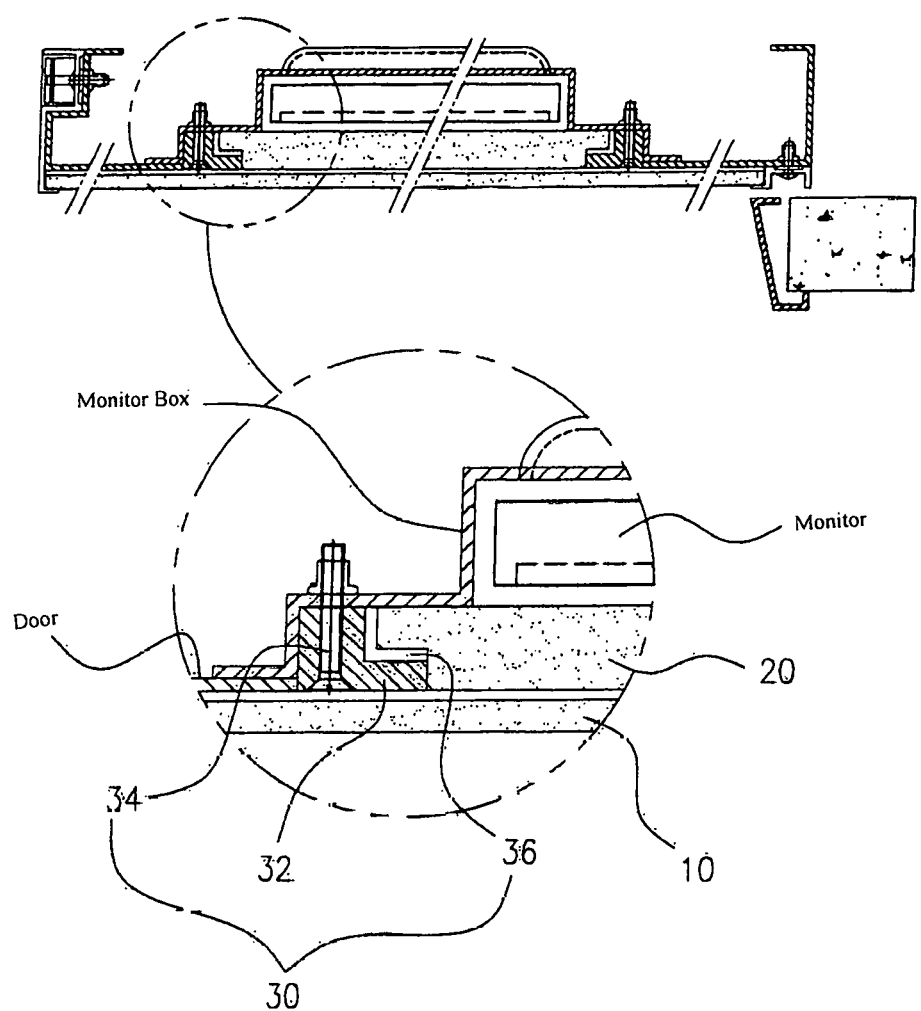
FIG. 5 is a lateral cross-sectional view and a partially detailed view that correspond to FIG. 4.

FIG. 5 is a lateral cross-sectional view and a partially detailed view that correspond to FIG. 4, and the reinforcing glass plate fixing means 30 is illustrated in FIGS. 4 and 5 in detail. The reinforcing glass plate support 32 having an L-shaped cross section is installed along an edge of the monitor box MB. In addition, the reinforcing glass plate support 32 is fastened to the monitor box MB by a fastener 34 that penetrates the reinforcing glass plate support 32. As the fasteners, bolts and nuts are most widely used, but screw nails or the like may be used. In addition, a shock absorbing member 36, which is made of an elastic material, is disposed between the reinforcing glass plate support 32 and the edge of the reinforcing glass plate 20 so as to prevent the edge of the reinforcing glass plate 20 from being damaged by impact. In a state in which the reinforcing glass plate fixing means 30 including the support, the fastener, and the shock absorbing member is completely installed as illustrated in FIGS. 4 and 5 a front surface of the door D, a front surface of the reinforcing glass plate support 32, and a front surface of the reinforcing glass plate 20 may be matched. That is, completely flat surfaces need to be formed so that impact transmitted from the outside of the decorative glass plate 10 may be uniformly distributed without being concentrated at any one location.

Figure 6:
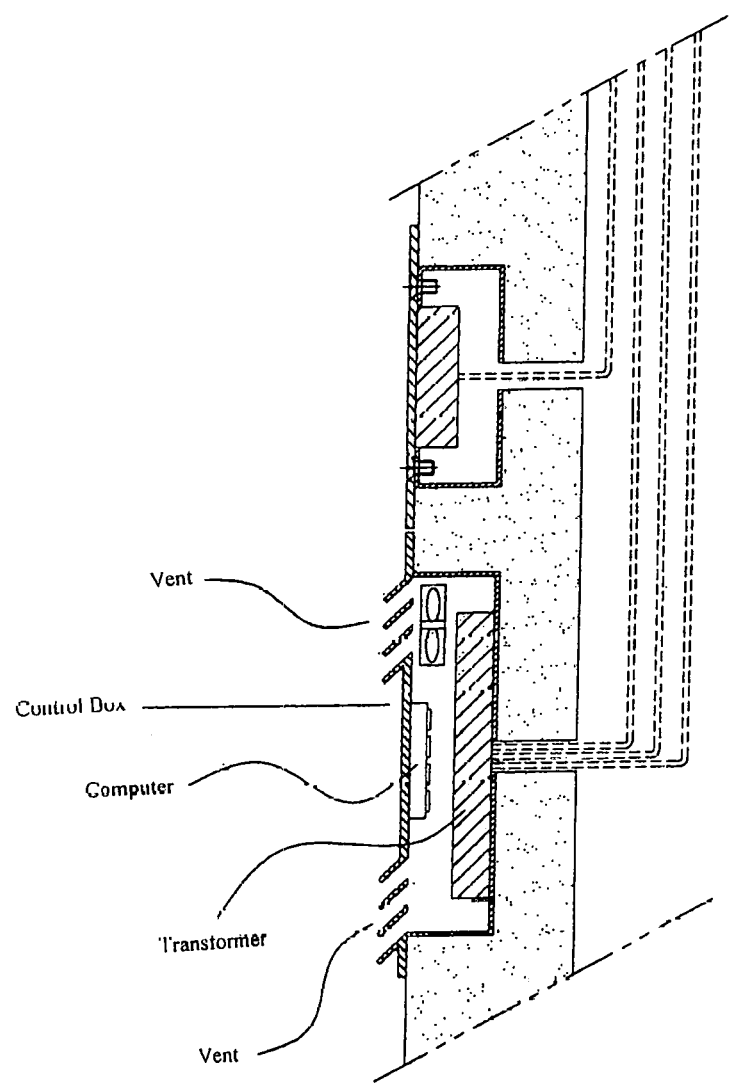
FIG. 6 is a cross-sectional view illustrating a case in which the control box C is installed immediately below the floor selection button B.

FIG. 6 is a cross-sectional view illustrating a case in which the control box C is installed immediately below the floor selection button B, the local computer C1 and the electric transformer T are accommodated in the control box C, and the control box C may include a second ventilation means C2 for discharging inside air. The second ventilation means C2 may also include an air inlet at the lower side and an air outlet at the upper side, as described below. Of course, a ventilator may be installed to achieve forced convection as necessary.

The control box C may be positioned below the floor selection button B, but may be installed on an inner wall surface of an elevator hoist hole of each floor as necessary.

The invention claimed is:
1. A monitor system for an elevator door comprising:
a decorative glass plate 10 which is attached to a door surface of an elevator so as to cover the entire door surface;
a monitor box MB which is fixed to a rear surface of the elevator door D, has a rectangular parallelepiped shape, and protrudes to a rear side of the elevator door so as to accommodate a monitor M;

the monitor M which is fixed in the monitor box MB;

a reinforcing glass plate 20 which is disposed between the glass plate 10 and the monitor M, and has a size that covers the entire monitor so as to protect the monitor M from frontal impact;

a reinforcing glass plate fixing means 30 which supports and fixes the reinforcing glass plate 20 so that the reinforcing glass plate 20 has the same height as the surface of the elevator door D;

a ventilation means 40 which discharges heat generated from the monitor M to the outside of the elevator door D; and a control box C which is connected to the monitor M, and controls various types of signals and electricity supply for the monitor, wherein the reinforcing glass plate fixing means 30 includes a reinforcing glass plate support 32 which is installed along an edge of the monitor box MB, and has an L-shaped cross section, a fastener 34 which penetrates the reinforcing glass plate support 32 so as to fasten the reinforcing glass plate support 32 to the monitor box MB, and a shock absorbing member 36 which is disposed between the reinforcing glass plate support 32 and the edge of the reinforcing glass plate 20, and made of an elastic material, and a front surface of the door D, a front surface of the reinforcing glass plate support 32, and a front surface of the reinforcing glass plate 20 are matched in a state in which installation is completed.

2. The monitor system of claim 1, wherein the control box C includes a local computer C1, an electric transformer T, and a second ventilation means C2.

3. The monitor system of claim 1, wherein the ventilation means 40 includes an air inlet 42 formed at a lower end of the monitor box MB, and an air outlet 44 formed at an upper end of the monitor box MB.

4. The monitor system of claim 3, wherein the control box C is positioned below a floor selection button B, or installed on an inner wall surface of an elevator hoist hole.

5. The monitor system of claim 2, wherein the ventilation means 40 includes an air inlet 42 formed at a lower end of the monitor box MB, and an air outlet 44 formed at an upper end of the monitor box MB.

6. The monitor system of claim 5, wherein the control box C is positioned below a floor selection button B, or installed on an inner wall surface of an elevator hoist hole.

\* \* \* \* \*